United States Patent
Schaef et al.

(10) Patent No.: US 9,718,732 B2
(45) Date of Patent: Aug. 1, 2017

(54) CRACK-REDUCING ADMIXTURE FOR CEMENTITIOUS COMPOSITIONS

(71) Applicant: Construction Research & Technology GmbH, Trostberg (DE)

(72) Inventors: Steve Schaef, Brookpark, OH (US); Emmanuel Attiogbe, Solon, OH (US); Charles Kerobo, Bloomfield Hills, MI (US); Stefan Muessig, Sagamore Hills, OH (US); Daniel Vojtko, Ravenna, OH (US)

(73) Assignee: Construction Research & Technology GmbH, Trostberg (DE)

( * ) Notice: Subject to any disclaimer, the term of this patent is extended or adjusted under 35 U.S.C. 154(b) by 125 days.

(21) Appl. No.: 14/549,942

(22) Filed: Nov. 21, 2014

(65) Prior Publication Data

US 2015/0144033 A1  May 28, 2015

(51) Int. Cl.
| | |
|---|---|
| C04B 24/02 | (2006.01) |
| C04B 24/04 | (2006.01) |
| C04B 24/08 | (2006.01) |
| C04B 24/16 | (2006.01) |
| C04B 24/20 | (2006.01) |
| C04B 24/34 | (2006.01) |
| C04B 28/02 | (2006.01) |
| C04B 28/04 | (2006.01) |
| C04B 40/00 | (2006.01) |
| C04B 103/00 | (2006.01) |
| C04B 111/34 | (2006.01) |

(52) U.S. Cl.
CPC .......... *C04B 24/02* (2013.01); *C04B 24/023* (2013.01); *C04B 24/04* (2013.01); *C04B 24/08* (2013.01); *C04B 24/16* (2013.01); *C04B 24/20* (2013.01); *C04B 24/34* (2013.01); *C04B 28/02* (2013.01); *C04B 28/04* (2013.01); *C04B 40/0039* (2013.01); *C04B 2103/0048* (2013.01); *C04B 2111/343* (2013.01); *Y02W 30/92* (2015.05); *Y02W 30/94* (2015.05)

(58) Field of Classification Search
CPC ....... C04B 24/02; C04B 24/023; C04B 24/04; C04B 24/08; C04B 24/20; C04B 24/16; C04B 24/34
See application file for complete search history.

(56) References Cited

U.S. PATENT DOCUMENTS

| | | | |
|---|---|---|---|
| 5,556,460 | A | 9/1996 | Berke et al. |
| 5,603,760 | A | 2/1997 | Berke et al. |
| 5,912,284 | A | 6/1999 | Hirata et al. |
| 6,277,191 | B1 | 8/2001 | Budiansky et al. |
| 6,454,850 | B2 | 9/2002 | Yamashita et al. |
| 6,506,945 | B2 | 1/2003 | Kluesener et al. |
| 6,686,330 | B2 | 2/2004 | Jordan, IV et al. |
| 6,898,917 | B2 | 5/2005 | Durning et al. |
| 6,911,494 | B2 | 6/2005 | Yamashita et al. |
| 6,919,388 | B2 | 7/2005 | Nishikawa et al. |
| 7,219,479 | B2 | 5/2007 | Durning et al. |
| 7,253,220 | B2 | 8/2007 | Yamashita et al. |
| 7,259,197 | B2 | 8/2007 | Mitsui et al. |
| 7,691,921 | B2 | 4/2010 | Asano et al. |
| 8,246,741 | B2 | 8/2012 | Wombacher et al. |
| 8,277,556 | B2 | 10/2012 | Berke et al. |
| 8,362,180 | B2 | 1/2013 | Reichenbach-Klinke et al. |
| 8,461,232 | B2 | 6/2013 | Vierle et al. |
| 2007/0073022 | A1 | 3/2007 | Yuasa et al. |
| 2007/0095256 | A1 | 5/2007 | Miyagawa et al. |
| 2011/0291053 | A1 | 12/2011 | Masanaga |

(Continued)

FOREIGN PATENT DOCUMENTS

| | | | |
|---|---|---|---|
| EP | 2 522 642 A1 | 11/2012 | |
| JP | 2008-120664 | * 5/2008 | ............. C04B 24/26 |

(Continued)

OTHER PUBLICATIONS

PCT/IB2014/066247—International Search Report, mailed Apr. 22, 2015.
PCT/IB2014/066247—International Written Opinion, mailed Apr. 22, 2015.
Nmai, Charles, "Durable Concrete Chemistry", Concrete Construction, Nov., 2013.
ACI Committee 224, "Control of Cracking in Concrete Structures", ACI Committee Report, May 16, 2001.
ASTM International, "Standard Test Method for Determining Age at Cracking and Induced Tensile Stress Characteristics of Mortar and Concrete under Restrained Shrinkage", ASTM C1581/C1581M-09a.

*Primary Examiner* — Robert Harlan
(74) *Attorney, Agent, or Firm* — Curatolo Sidoti Co., LPA; Vicent A. Cortese; Floyd Trillis, III (57) ABSTRACT

A cementitious composition including at least one cementitious material and at least one crack reducing admixture including: (i) from 0 to about 5 weight percent of at least one alcohol, based on the total weight of the admixture excluding water; and (ii) a compound having the chemical structure of formula (III):

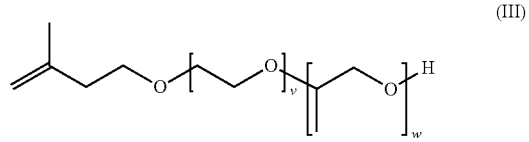

(III)

wherein: v is an integer from 0 to 50 and w is an integer from 0 to 50, with the proviso that the sum of v and w is at least 1 but not greater than 50. Also, methods of making the cementitious composition, reducing or eliminating the formation of cracks in a cementitious composition as the cementitious composition cures, and limiting the size of cracks which form in a cementitious composition as the cementitious composition cures using an admixture for cementitious compositions as described herein.

22 Claims, 4 Drawing Sheets

(56) References Cited

U.S. PATENT DOCUMENTS

| | | |
|---|---|---|
| 2012/0041106 A1 | 2/2012 | Vierle et al. |
| 2012/0238717 A1 | 9/2012 | Yoneda et al. |
| 2012/0289626 A1 | 11/2012 | Nawa et al. |
| 2012/0289630 A1 | 11/2012 | Masanaga et al. |
| 2013/0005863 A1 | 1/2013 | Bichler et al. |

FOREIGN PATENT DOCUMENTS

| | | |
|---|---|---|
| JP | 2008-120664 A | 5/2008 |
| JP | 2011-102202 A | 5/2011 |

\* cited by examiner

CRACK-REDUCING ADMIXTURE FOR CEMENTITIOUS COMPOSITIONS

This application claims the benefit of the filing date under 35 U.S.C. §119(e) from U.S. Provisional Application for Patent Ser. No. 61/907,779, filed on Nov. 22, 2013.

Provided is a crack reducing admixture for cementitious compositions.

Cementitious compositions may be prone to cracking during curing of the cementitious composition for various reasons, due to the low tensile strength of many cured cementitious compositions. Unless precautions are taken, cementitious compositions are likely to shrink during curing as a result of the chemical reactions taking place during curing, as well as the loss of water during curing. Cracks are detrimental to the longevity of cured cementitious compositions because cracks generally reduce the load-carrying capacity of the cured cementitious composition. Cracks also allow deleterious materials to enter the volume of a cured cementitious composition, which can further degrade the cured cementitious composition. One mode of such degradation occurs when water enters the cracks or pores of a cured cementitious composition and freezes, resulting in expansion of the water, applying force to the cured cementitious composition which may create additional cracks in the cured cementitious composition. So-called "freeze-thaw cycling" may exacerbate this particular problem over time.

Shrinkage reducing admixtures are a class of materials used to reduce both the magnitude of shrinkage and the potential for cracking of cementitious compositions during curing. However, when cracks eventually form in curing cementitious compositions containing conventional shrinkage reducing admixtures, the cracks may be as wide as cracks which form in curing cementitious compositions without shrinkage reducing admixtures.

Further, conventional shrinkage reducing admixtures may not be compatible with air entraining admixtures. Air entraining admixtures are a class of materials used to create air voids in cementitious compositions. The air voids can act to reduce the stress on cured cementitious compositions during freeze-thaw cycling, improving the longevity of the cured cementitious composition. However, conventional shrinkage reducing admixtures may have a detrimental effect on the structure of the air-void system created by use of air entraining agents, thereby reducing the cured cementitious composition's resistance to damage that may be caused by freeze-thaw cycling.

What is needed is a crack reducing admixture for cementitious compositions which is capable of: (i) reducing the potential for cracking of cementitious compositions during curing; and/or (ii) reducing the width of cracks which may form in curing cementitious compositions.

Embodiments of the subject matter are disclosed with reference to the accompanying drawings and are for illustrative purposes only.

A crack reducing admixture for cementitious compositions is provided, comprising at least one polyoxyalkylene alcohol derivative of the formula (I):

wherein:
$R^1O$ is a branched- or straight-chain, saturated or unsaturated $C_3$ to $C_{14}$ alcohol derived moiety, optionally a branched- or straight-chain, saturated or unsaturated $C_4$ to $C_{10}$ alcohol derived moiety, further optionally a branched- or straight-chain, saturated or unsaturated $C_4$ to $C_6$ alcohol derived moiety; and
$[R^2O]_x$ is a block or heteric/block polyoxyalkylene polymer having a cloud point of about 60° C. to about 70° C. in a 1.5% aqueous solution, wherein the cloud point may be determined by measuring the cloud point of a compound of the formula HO—$[R^2O]_x$—H.

A method of providing crack reduction is also provided, comprising adding to an uncured cementitious composition, the crack reducing admixture of formula (I).

In certain embodiments, each $R^2O$ may independently be a $C_1$ to $C_6$ alkylene oxide; and x may be an integer from 0 to 50. For example, $R^2O$ may be at least one of ethylene oxide, propylene oxide, butylene oxide or tetrahydrofuran. In certain embodiments, x may be an integer from 1 to 25. In certain embodiments, x may be an integer from 2 to 10. Furthermore, it is to be understood that the minimum value for a range of values of x may be any integer from 0 to 49, inclusive, and the maximum value for a range of values of x may be any integer from 1 to 50, inclusive.

In certain embodiments, the crack reducing admixture may comprise at least one polyoxyalkylene alcohol derivative of the formula (II):

wherein:
$R^3O$ is a branched- or straight-chain, saturated or unsaturated $C_3$ to $C_{14}$ alcohol derived moiety;
$R^4O$ is a $C_1$ to $C_6$ alkylene oxide;
$R^5O$ is a $C_1$ to $C_6$ alkylene oxide different from $R^4O$;
m is an integer from 0 to 50; optionally from 1 to 25; further optionally from 2 to 10; and
n is an integer from 0 to 50; optionally from 1 to 25; further optionally from 2 to 10;
with the proviso that the sum of m and n is at least 1 but not greater than 50.

It is to be understood that the minimum value for a range of values of m and/or n may independently be any integer from 0 to 49, inclusive, and the maximum value for a range of values of m and/or n may independently be any integer from 1 to 50, inclusive, provided the sum of m and n does not exceed 50.

In certain embodiments, a method of providing crack reduction is provided, comprising adding to an uncured cementitious composition, the crack reducing admixture of formula (II).

In certain embodiments, the crack reducing admixture may comprise at least one polyethylene oxide-polypropylene oxide isoprenol derivative of the formula (III):

wherein:
v is an integer from 0 to 50; optionally from 1 to 25; further optionally from 2 to 10; and
w is an integer from 0 to 50; optionally from 1 to 25; further optionally from 2 to 10;
with the proviso that the sum of v and w is at least 1 but not greater than 50.

It is to be understood that the minimum value for a range of values of v and/or w may independently be any integer from 0 to 49, inclusive, and the maximum value for a range of values of v and/or w may independently be any integer from 1 to 50, inclusive, provided the sum of v and w does not exceed 50.

In certain embodiments, a method of providing crack reduction is provided, comprising adding to an uncured cementitious composition, the crack reducing admixture of formula (III).

In certain embodiments, the crack reducing admixture may comprise a compound having the chemical structure of formula (IV):

In certain embodiments, a method of providing crack reduction is provided, comprising adding to an uncured cementitious composition, the crack reducing admixture of formula (IV).

In certain embodiments, the crack reducing admixture may comprise one or more than one of the crack reducing admixtures of at least one of formulas (I), (II) or (III), optionally in combination with the crack reducing admixture of formula (IV).

In certain embodiments, a method of providing crack reduction is provided, comprising adding to an uncured cementitious composition, a crack reducing admixture comprising one or more than one of the crack reducing admixtures of at least one of formulas (I), (II) or (III), optionally in combination with the crack reducing admixture of formula (IV).

In certain embodiments, the crack reducing admixture may additionally comprise at least one alcohol, such as isoprenol, optionally in an amount of from 0 to about 5 weight percent, based on the total weight of the admixture excluding water. In certain embodiments, the crack reducing admixture may additionally comprise at least one alcohol, such as isoprenol, optionally in an amount of from greater than 0 to about 5 weight percent, based on the total weight of the admixture excluding water. In certain embodiments, the minimum amount of the at least one alcohol present in the admixture may be about 0.5 weight percent, optionally about 1 weight percent, further optionally about 1.5 weight percent, further optionally about 2 weight percent, further optionally about 2.5 weight percent, further optionally about 3 weight percent, further optionally about 3.5 weight percent, further optionally about 4 weight percent, further optionally about 4.5 weight percent, based on the total weight of the admixture excluding water. In certain embodiments, the maximum amount of the at least one alcohol present in the admixture may be about 4.5 weight percent, optionally about 4 weight percent, further optionally about 3.5 weight percent, further optionally about 3 weight percent, further optionally about 2.5 weight percent, further optionally about 2 weight percent, further optionally about 1.5 weight percent, further optionally about 1 weight percent, further optionally about 0.5 weight percent, based on the total weight of the admixture excluding water. In certain embodiments, the at least one alcohol may comprise unreacted amounts of the alcohol(s) used to produce the polyoxyalkylene alcohol derivative.

In certain embodiments, the crack reducing admixture may additionally comprise an amount of an acid, such as acetic acid, effective to at least partially neutralize the admixture to reduce or eliminate the formation of precipitates, such as potassium carbonate, in the admixture. In certain embodiments, neutralization of at least about 75% may be sufficient to at least partially avoid the formation of precipitates. In embodiments in which potassium carbonate may form as a precipitate, the potassium may be present as residual polymerization catalyst.

Also provided is a cementitious composition comprising a cementitious material and at least one crack reducing admixture as described herein. In certain embodiments, the cementitious composition may also comprise at least one of an air entraining admixture, aggregate or water. The air entraining admixture may comprise at least one synthetic air entrainer, such as fatty acid air entrainers, alkylbenzene sulfonate-based air entrainers, α-olefin sulfonate-based air entrainers, or ethoxylated alcohol based air entrainers and/or at least one natural air entrainer, such as tall oil, vinsol resin or rosin.

Also provided is a method of making a cementitious composition comprising mixing a cementitious material and at least one crack reducing admixture as described herein.

In certain embodiments, the subject cementitious composition may include cement, at least one crack reducing admixture as described herein, aggregate and water. The at least one crack reducing admixture may be present in the cementitious composition in an amount of about 0.25 to about 4 gallons per cubic yard of the cementitious composition. In certain embodiments, the at least one crack reducing admixture may be present in the cementitious composition in an amount of about 0.5 to about 3 gallons per cubic yard of the cementitious composition. In certain embodiments, the at least one crack reducing admixture may be present in the cementitious composition in an amount of about 1 to about 2 gallons per cubic yard of the cementitious composition. In certain embodiments, the volume of the crack reducing admixture added to the cementitious composition may replace the same volume of water in the cementitious composition.

In certain embodiments, the subject crack reducing admixture may reduce or eliminate the formation of cracks in a cementitious composition as the cementitious composition cures, as compared to cementitious compositions which do not include the subject crack reducing admixture. In certain embodiments, the subject crack reducing admixture may also function as a shrinkage reducing agent.

In certain embodiments, the subject crack reducing admixture may limit the size of cracks which form in a cementitious composition during curing of the cementitious composition to a width of less than or equal to about 175 µm. In certain embodiments, the subject crack reducing admixture may limit the size of cracks which form in a cementitious composition during curing of the cementitious composition to a width less than or equal to about 100 µm. The size of cracks in curing or cured cementitious compositions may be determined by any known procedure, such as, but not limited to, use of a linear variable differential transformer sensor (LVDTS) or use of a hand-held crack comparator. A hand-held crack comparator is a hand-held microscope with a scale on the lens closest to the surface being viewed.

As used herein, "during curing" in relation to the formation of cracks means cracks which form as a result of the curing of the cementitious composition under any conditions, as opposed to cracks which may form as a result of external forces which may be applied to an at least partially cured cementitious composition. Such external forces include, without limitation, subsidence of the material underneath the cementitious composition, settling forces, freeze-thaw cycling, and/or tensile forces. As used herein, the term "curing" refers to the hydration reaction which occurs after water is added to the subject cementitious composition. Thus, the subject cementitious composition may or may not include water.

Studies have shown that cured cementitious compositions which have cracks having widths of less than or equal to about 175 µm are able to transmit forces, such as tensile forces, across the cracks, and may also result in a water-impermeable cementitious composition.

Without wishing to be limited by theory, it is believed that this is possible because the small size of the cracks allows the concrete to "self-heal". By "self-heal" or "self-healing", what is meant is the ability of a material to intrinsically correct damage caused by mechanical usage over time without human intervention. One possible mode by which a cementitious composition may self-heal is that, when a crack forms in a curing or cured cementitious composition, unreacted cement present on either side of the crack in the cementitious composition may be exposed to water and/or water vapor in the environment, allowing the unreacted cement to react and at least partially bridge the gap formed by the crack.

It is also possible that the small size of cracks which may occur in a curing cementitious composition produced when the crack reducing admixture was present, allow for at least partial interlocking of the cementitious composition on either side of the crack, such that forces may be transmitted across the crack by the interlocking portions of the cementitious composition on either side of the crack.

Reducing the potential for cracking of cementitious compositions during curing and/or reducing the width of cracks which may form in curing cementitious compositions, may prolong the time to failure of the cementitious composition when tested in accordance with ASTM C1581, which is incorporated herein by reference. ASTM C1581 is a test method which describes the laboratory determination of the age at cracking and induced tensile stress characteristics of cementitious compositions under restrained shrinkage. The procedure may be used to determine the effects of variations in the proportions and material properties of cementitious compositions on cracking due to both drying shrinkage and deformations caused by autogenous shrinkage and heat of hydration.

In ASTM C1581, a sample of a freshly mixed cementitious composition is compacted in a circular mold around an instrumented steel ring. The compressive strain developed in the steel ring caused by shrinkage of the curing cementitious composition is measured from the time of molding. Cracking of the test specimen is indicated by a sudden decrease in compressive strain experienced by the steel ring. The age at cracking and the rate of tensile stress development in the test specimen are indicators of the cementitious composition's resistance to cracking under restrained shrinkage.

Furthermore, utilizing the subject crack reducing admixture in cementitious compositions including air entraining admixtures may also allow the cementitious compositions to pass the ASTM C666 (which is incorporated herein by reference) test requirements for resistance to freeze-thaw cycles.

As discussed herein, utilizing the subject crack reducing admixture in cementitious compositions may reduce or eliminate crack formation in cementitious compositions during curing. In certain embodiments, the subject cementitious compositions may exhibit no cracks wider than about 175 µm, in certain embodiments no cracks wider than about 100 µm. In testing, the subject cementitious compositions have been shown to exhibit no cracking, to exhibiting crack sizes of from about 50 µm to about 175 µm.

In order to increase the possibility of reducing or eliminating crack formation in cementitious compositions during curing, the subject crack reducing admixture may be used in cementitious compositions which also include fibers. In the construction field, many methods of protecting cementitious compositions from tensile stresses and subsequent cracking have been developed through the years. One method involves distributing fibers throughout a fresh cementitious mixture. Upon curing, this cementitious composition is referred to as fiber-reinforced cement. Fibers may be made of zirconium materials, carbon, steel, fiberglass, or synthetic materials, e.g., polypropylene, nylon, polyethylene, polyester, rayon, high-strength aramid, or mixtures thereof.

Whether or not the subject crack reducing admixture is used in cementitious composition including fibers, cementitious compositions including the subject crack reducing admixture may be used in water-retaining structures, jointless floors, and/or bridge decks, and such cementitious compositions may be suitable for exposure to freeze-thaw cycles and corrosive materials, such as deicing chemicals.

The cementitious material may be a Portland cement, a calcium aluminate cement, a magnesium phosphate cement, a magnesium potassium phosphate cement, a calcium sulfoaluminate cement or any other suitable hydraulic binder. Aggregate may be included in the cementitious composition. The aggregate can be silica, quartz, sand, crushed marble, glass spheres, granite, limestone, calcite, feldspar, alluvial sands, any other durable aggregate, and mixtures thereof.

The subject crack reducing admixture may contain other admixtures or ingredients and should not be necessarily limited to the stated compositions.

A cementitious composition as described herein may contain other admixtures or ingredients and should not be necessarily limited to the stated formulations. These admixtures and/or ingredients may include, but are not limited to: pozzolanic materials, dispersants, set and strength accelerators/enhancers, set retarders, water reducers, corrosion inhibitors, wetting agents, water soluble polymers, rheology modifying agents, water repellents, non-degrading fibers, damp proofing admixtures, permeability reducers, fungicidal admixtures, germicidal admixtures, insecticide admixtures, alkali-reactivity reducer, bonding admixtures, shrinkage reducing admixtures, and any other admixture or additive suitable for use in cementitious compositions. The admixtures and cementitious compositions described herein need not contain any of the foregoing components, but may contain any number of the foregoing components.

Aggregate may be included in the cementitious composition to provide mortars which include fine aggregate, and concretes which include fine and coarse aggregates. The fine aggregates are materials that almost entirely pass through a Number 4 sieve (ASTM C 125 and ASTM C 33), such as silica sand. The coarse aggregates are materials that are predominantly retained on a Number 4 sieve (ASTM C 125 and ASTM C 33), such as silica, quartz, crushed marble, glass spheres, granite, limestone, calcite, feldspar, alluvial sands, sands or any other durable aggregate, and mixtures thereof.

A pozzolanic material is a siliceous or aluminosiliceous material that possesses little or no cementitious value but will, in the presence of water and in finely divided form, chemically react with the cementitious material during hydration to form materials with cementitious properties. Diatomaceous earth, opaline cherts, clays, shales, fly ash, slag, silica fume, volcanic tuffs and pumicites are some of the known pozzolans. Certain ground granulated blast-furnace slags and high calcium fly ashes possess both pozzolanic and cementitious properties. Natural pozzolan is a term of art used to define the pozzolans that occur in nature, such as volcanic tuffs, pumices, trasses, diatomaceous earths, opaline cherts, and some shales. Nominally inert materials can also include finely divided raw quartz, dolomites, limestones, marble, granite, and others. Fly ash is defined in ASTM C618.

If used, silica fume can be uncompacted or can be partially compacted or added as a slurry. Silica fume additionally reacts with the hydration byproducts of the cement binder, which provides for increased strength of the finished articles and decreases the permeability of the finished articles. The silica fume, or other pozzolans, such as fly ash or calcined clay, such as metakaolin, may be added to the cementitious wet cast mixture in an amount from about 5% to about 70% based on the weight of cementitious material.

A dispersant, if used, may be any suitable dispersant such as lignosulfonates, beta naphthalene sulfonates, sulfonated melamine formaldehyde condensates, polyaspartates, polycarboxylates with and without polyether units, naphthalene sulfonate formaldehyde condensate resins, or oligomeric dispersants.

Polycarboxylate dispersants may be used, by which is meant a dispersant having a carbon backbone with pendant side chains, wherein at least a portion of the side chains are attached to the backbone through a carboxyl group, an ether group, or an amide or imide group. The term dispersant is also meant to include those chemicals that also function as a plasticizer, high range water reducer, fluidizer, antiflocculating agent, or superplasticizer for cementitious compositions.

The term oligomeric dispersant refers to oligomers that are a reaction product of: component A, optionally component B, and component C; wherein each component A is independently a nonpolymeric, functional moiety that adsorbs onto a cementitious particle; wherein component B is an optional moiety, where if present, each component B is independently a nonpolymeric moiety that is disposed between the component A moiety and the component C moiety; and wherein component C is at least one moiety that is a linear or branched water soluble, nonionic polymer substantially non-adsorbing to cement particles. Oligomeric dispersants are disclosed in U.S. Pat. No. 6,133,347, U.S. Pat. No. 6,492,461, and U.S. Pat. No. 6,451,881.

Set and strength accelerators/enhancers which may be used include, but are not limited to: a nitrate salt of an alkali metal, alkaline earth metal, or aluminum; a nitrite salt of an alkali metal, alkaline earth metal, or aluminum; a thiocyanate of an alkali metal, alkaline earth metal or aluminum; an alkanolamine; a thiosulphate of an alkali metal, alkaline earth metal, or aluminum; a hydroxide of an alkali metal, alkaline earth metal, or aluminum; a carboxylic acid salt of an alkali metal, alkaline earth metal, or aluminum (preferably calcium formate); a polyhydroxylalkylamine; and/or a halide salt of an alkali metal or alkaline earth metal (preferably bromide).

The salts of nitric acid have the general formula $M(NO_3)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

Nitrite salts have the general formula $M(NO_2)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

The salts of the thiocyanic acid have the general formula $M(SCN)_b$, where M is an alkali metal, or an alkaline earth metal or aluminum, and where b is 1 for alkali metal salts, 2 for alkaline earth salts and 3 for aluminum salts. These salts are variously known as sulfocyanates, sulfocyanides, rhodanates or rhodanide salts. Preferred are thiocyanic acid salts of Na, K, Mg, Ca and Al.

Alkanolamine is a generic term for a group of compounds in which trivalent nitrogen is attached directly to a carbon atom of an alkyl alcohol. A representative formula is $N[H]_c[(CH_2)_d CHRCH_2 R]_e$, where R is independently H or OH, c is 3-e, d is 0 to about 4 and e is 1 to about 3. Examples include, but are not limited to, are monoethanoalamine, diethanolamine, triethanolamine and triisopropanolamine.

The thiosulfate salts have the general formula $M_f(S_2O_3)_g$ where M is alkali metal or an alkaline earth metal or aluminum, and f is 1 or 2 and g is 1, 2 or 3, depending on the valencies of the M metal elements. Preferred are thiosulfate acid salts of Na, K, Mg, Ca and Al.

The carboxylic acid salts have the general formula RCOOM wherein R is H or $C_1$ to about $C_{10}$ alkyl, and M is alkali metal or an alkaline earth metal or aluminum. Preferred are carboxylic acid salts of Na, K, Mg, Ca and Al. An example of carboxylic acid salt is calcium formate.

A polyhydroxylalkylamine may have the general formula:

wherein h is 1 to 3, i is 1 to 3, j is 1 to 3, and k is 0 to 3. A preferred polyhydroxyalkylamine is tetrahydroxyethylethylenediamine.

Set retarding, or also known as delayed-setting or hydration control, admixtures are used to retard, delay, or slow the rate of setting of cementitious compositions. Set retarders are used to offset the accelerating effect of hot weather on the setting of cementitious compositions, or delay the initial set of cementitious compositions when difficult conditions of placement occur, or problems of delivery to the job site, or to allow time for special finishing processes. Most set retarders also act as low level water reducers and can also be used to entrain some air into cementitious compositions. Lignosulfonates, hydroxylated carboxylic acids, borax, gluconic, tartaric and other organic acids and their corresponding salts, phosphonates, certain carbohydrates such as sugars, polysaccharides and sugar-acids and mixtures thereof can be used as retarding admixtures.

Corrosion inhibitors serve to protect embedded reinforcing steel from corrosion. The high alkaline nature of cementitious compositions causes a passive and non-corroding protective oxide film to form on the steel. However, carbonation or the presence of chloride ions from deicers or seawater, together with oxygen can destroy or penetrate the film and result in corrosion. Corrosion-inhibiting admixtures chemically slow this corrosion reaction. The materials most commonly used to inhibit corrosion are calcium nitrite, sodium nitrite, sodium benzoate, certain phosphates or fluorosilicates, fluoroaluminates, amines, organic based water repelling agents, and related chemicals.

Dampproofing admixtures reduce the permeability of concrete that has low cement contents, high water-cement ratios, or a deficiency of fines in the aggregate portion. These admixtures retard moisture penetration into wet concrete and include certain soaps, stearates, and petroleum products.

Permeability reducers are used to reduce the rate at which water under pressure is transmitted through cementitious compositions. Silica fume, fly ash, ground slag, metakaolin, natural pozzolans, water reducers, and latex can be employed to decrease the permeability of the cementitious compositions.

Bacterial and fungal growth on or in cured cementitious compositions may be partially controlled through the use of fungicidal, germicidal, and insecticidal admixtures. The most effective materials for these purposes are polyhalogenated phenols, dieldrin emulsions, and copper compounds.

Coloring admixtures are usually composed of pigments, either organic such as phthalocyanine or inorganic pigments such as metal-containing pigments that comprise, but are not limited to metal oxides and others, and can include, but are not limited to, iron oxide containing pigments, chromium oxide, aluminum oxide, lead chromate, titanium oxide, zinc white, zinc oxide, zinc sulfide, lead white, iron manganese black, cobalt green, manganese blue, manganese violet, cadmium sulfoselenide, chromium orange, nickel titanium yellow, chromium titanium yellow, cadmium sulfide, zinc yellow, ultramarine blue and cobalt blue.

Alkali-reactivity reducers may reduce the alkali-aggregate reaction and limit the disruptive expansion forces that this reaction can produce in cured cementitious compositions. Pozzolans (fly ash, silica fume), blast-furnace slag, salts of lithium and barium are especially effective.

The above listings of additional admixtures and additives are illustrative and not exhaustive or limiting.

The following examples are set forth merely to further illustrate the subject crack reducing admixture. The illustrative examples should not be construed as limiting the crack reducing admixture in any manner.

The following examples were prepared with Lehigh Type I/II cement, #57 limestone ("LS"), #8 limestone, sand, water, a water-reducing admixture ("WRA") and a crack reducing admixture ("CRA") comprising the compound of formula IV, above, in the amounts shown in Table 1. The amounts of cement, limestone, sand and water are in lbs/yd$^3$, and the amounts of the admixtures are in fluid ounces per hundred weight of cement.

TABLE 1

| Example No. | Cement | #57 LS | #8 LS | Sand | Water | WRA | CRA |
|---|---|---|---|---|---|---|---|
| 1 | 564 | 892 | 893 | 1445 | 282 | 4.8 | 3.9 |
| 2 | 564 | 892 | 893 | 1445 | 282 | 4.8 | 7.8 |
| 3 | 564 | 892 | 893 | 1445 | 282 | 4.8 | 11.6 |
| 4 | 564 | 892 | 893 | 1445 | 282 | 4.8 | 15.5 |
| 5 | 564 | 892 | 893 | 1445 | 282 | 4.8 | 19.4 |
| 6 | 564 | 892 | 893 | 1445 | 282 | 4.8 | 23.3 |
| 7 | 564 | 892 | 893 | 1445 | 282 | 4.8 | 27.1 |
| 8 | 564 | 892 | 893 | 1445 | 282 | 4.8 | 31.0 |
| 9 | 564 | 892 | 893 | 1445 | 282 | 4.8 | 38.8 |
| Comp. 10 | 564 | 892 | 893 | 1445 | 282 | 4.8 | — |

Examples 1-9 and Comparative Example 10 were tested for initial slump (inches) according to ASTM C143, air content (%) according to ASTM C138, density (lb/ft$^3$), shrinkage reduction (%) according to ASTM C157 relative to Comparative Example 10, and compressive strength (psi) at 7 days and 28 days according to ASTM C39. The results are reported in Table 2.

TABLE 2

| Example No. | Slump | Air | Density | Shrinkage Reduction | Comp. Strength 7 Days | Comp. Strength 28 Days |
|---|---|---|---|---|---|---|
| 1 | 8.5 | 2.6 | 153.1 | 20 | 4610 | 5830 |
| 2 | 7.75 | 2.2 | 153.1 | 24 | 4460 | 5730 |
| 3 | 8.5 | 1.9 | 153.9 | 32 | 4450 | 5730 |
| 4 | 9.0 | 1.6 | 153.9 | 45 | 4340 | 5430 |
| 5 | 8.75 | 1.5 | 154.7 | 52 | 4490 | 5620 |
| 6 | 8.0 | 1.4 | 154.3 | 57 | 4370 | 5470 |
| 7 | 8.5 | 1.9 | 154.3 | 60 | 4460 | 5530 |
| 8 | 8.0 | 1.5 | 154.7 | 55 | 4500 | 5510 |
| 9 | 8.5 | 1.4 | 154.3 | 60 | 4190 | 5720 |
| Comp. 10 | 7.5 | 2.5 | 152.7 | 0 | 4630 | 5860 |

The following examples were prepared with Lehigh Type I/II cement, #8 limestone ("LS"), sand, water, a water-reducing admixture ("WRA"), an air entraining admixture ("AE") and a crack reducing admixture ("CRA") comprising the compound of formula IV, above, in the amounts shown in Table 3. The amounts of cement, limestone, sand and water are in lbs/yd$^3$, and the amounts of the admixtures are in fluid ounces per hundred weight of cement.

TABLE 3

| Example No. | Cement | #8 LS | Sand | Water | WRA | AE | CRA |
|---|---|---|---|---|---|---|---|
| 11 | 611 | 1779 | 1267 | 275 | 4.5 | 0.9 | 3.9 |
| 12 | 611 | 1779 | 1267 | 275 | 4.5 | 1.2 | 7.8 |
| 13 | 611 | 1779 | 1267 | 275 | 4.9 | 1.9 | 11.6 |
| 14 | 611 | 1779 | 1267 | 275 | 4.8 | 2.1 | 15.5 |
| 15 | 611 | 1779 | 1267 | 275 | 4.5 | 2.2 | 23.3 |
| 16 | 611 | 1779 | 1267 | 275 | 4.5 | 3.7 | 31.0 |
| 17 | 611 | 1779 | 1267 | 275 | 4.5 | 5.4 | 38.3 |
| 18 | 611 | 1779 | 1267 | 275 | 4.5 | 7.7 | 46.5 |
| Comp. 19 | 611 | 1779 | 1267 | 275 | 4.5 | 1.2 | — |

Examples 11-18 and Comparative Example 19 were tested for initial slump (inches) according to ASTM C143, air content (%) according to ASTM C138, and density (lb/ft$^3$). The Examples were also tested according to ASTM C666 to determine their ability to withstand rapid freezing and thawing. A sample is considered to have passed ASTM C666 if it can survive at least 300 freeze-thaw cycles with a durability factor ("DF") greater than 60%. With regard to the ASTM C666 results, the results presented were obtained by averaging the results of three samples. The results are reported in Table 4.

TABLE 4

| Example No. | Slump | Air | Density | Cycles | DF |
|---|---|---|---|---|---|
| 11 | 9.0 | 8.0 | 146.9 | 300 | 100 |
| 12 | 8.0 | 7.2 | 149.4 | 300 | 100 |
| 13 | 8.75 | 8.0 | 147.8 | 300 | 100 |
| 14 | 9.0 | 6.5 | 149.0 | 300 | 100 |
| 15 | 9.0 | 6.0 | 149.8 | 300 | 100 |
| 16 | 8.5 | 6.0 | 149.8 | 300 | 93 |
| 17 | 8.5 | 7.2 | 146.5 | 300 | 99 |
| 18 | 8.5 | 7.0 | 147.8 | 300 | 94 |
| Comp. 19 | 8.0 | 7.2 | 148.2 | 300 | 99 |

Examples 1-9 and 11-18, in comparison with Comparative Example 10 and 19, show that the subject crack reducing admixtures may also act as shrinkage reducing admixtures, and may allow cementitious compositions including air entraining admixtures to pass the ASTM C666 test for freeze-thaw durability, without significantly impacting other physical properties of cementitious compositions.

The following examples were prepared with Lehigh Type I/II cement, class F fly ash, silica fume, #8 limestone ("LS"), sand, water, a water-reducing admixture ("WRA") and either no additional admixture, a conventional shrinkage reducing admixture ("SRA") or a crack reducing admixture ("CRA") comprising the compound of formula IV, above, in the amounts shown in Table 5. The amounts of cement, fly ash, silica fume, limestone, sand and water are in lbs/yd$^3$, and the amounts of the admixtures are in fluid ounces per hundred weight of cement. Table 5 also provides the slump in inches and the % air content for each example.

TABLE 5

| Example No. | Comp. 20 | Comp. 21 | 22 |
|---|---|---|---|
| Cement | 674 | 674 | 674 |
| Fly Ash | 50 | 50 | 50 |
| Silica Fume | 76 | 76 | 76 |
| #8 LS | 1812 | 1812 | 1812 |
| Sand | 1179 | 1179 | 1179 |
| Water | 280 | 280 | 280 |
| WRA | 11.1 | 11.4 | 11.7 |
| SRA | — | 31.0 | — |
| CRA | — | — | 31.0 |
| Slump (in.) | 9.5 | 9.25 | 9.5 |
| Air (%) | 2.1 | 2.3 | 2.1 |

Figure 1:
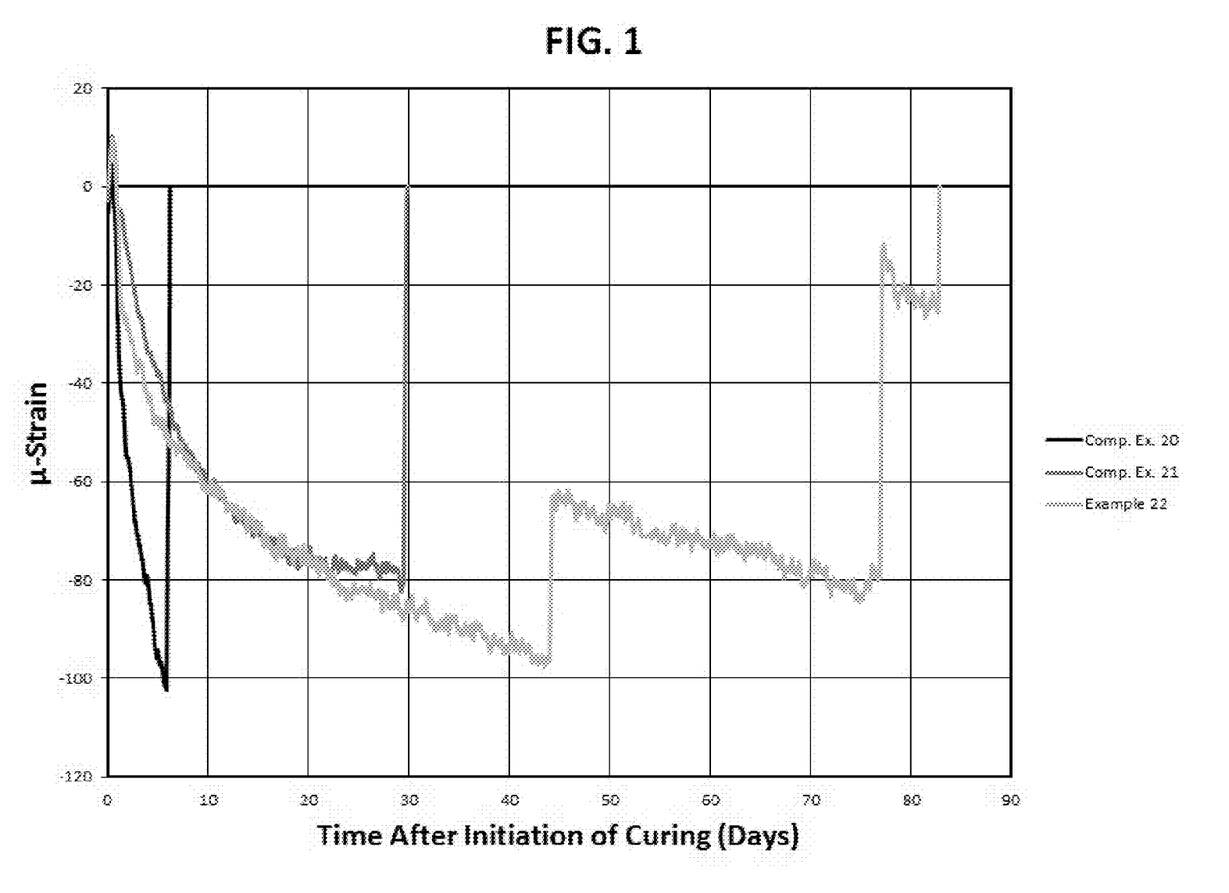
FIG. 1 is a chart depicting compressive strain versus time of comparative and illustrative cementitious compositions tested according to ASTM C1581.

Samples of cementitious composition according to Comparative Examples 20 and 21, and Example 22, were tested according to ASTM C1581. The results of this testing are shown in FIG. 1. FIG. 1 shows that cementitious compositions including a subject CRA exhibit longer times to failure (where the respective line on the chart goes to 0µ-strain) than cementitious compositions not including an SRA or a CRA and cementitious compositions including only a conventional SRA but not a CRA. Furthermore, FIG. 1 shows that both Comparative Examples 20 and 21 failed upon first cracking, in that the first sudden decrease in compressive strain (or increase in absolute strain) resulted in the cementitious composition completely failing. In contrast, Example 22 was able to maintain a compressive strain load after cracking, which cracking is indicated by the sudden decreases in compressive strain shown around 45 days and around 77 days.

Figure 2:
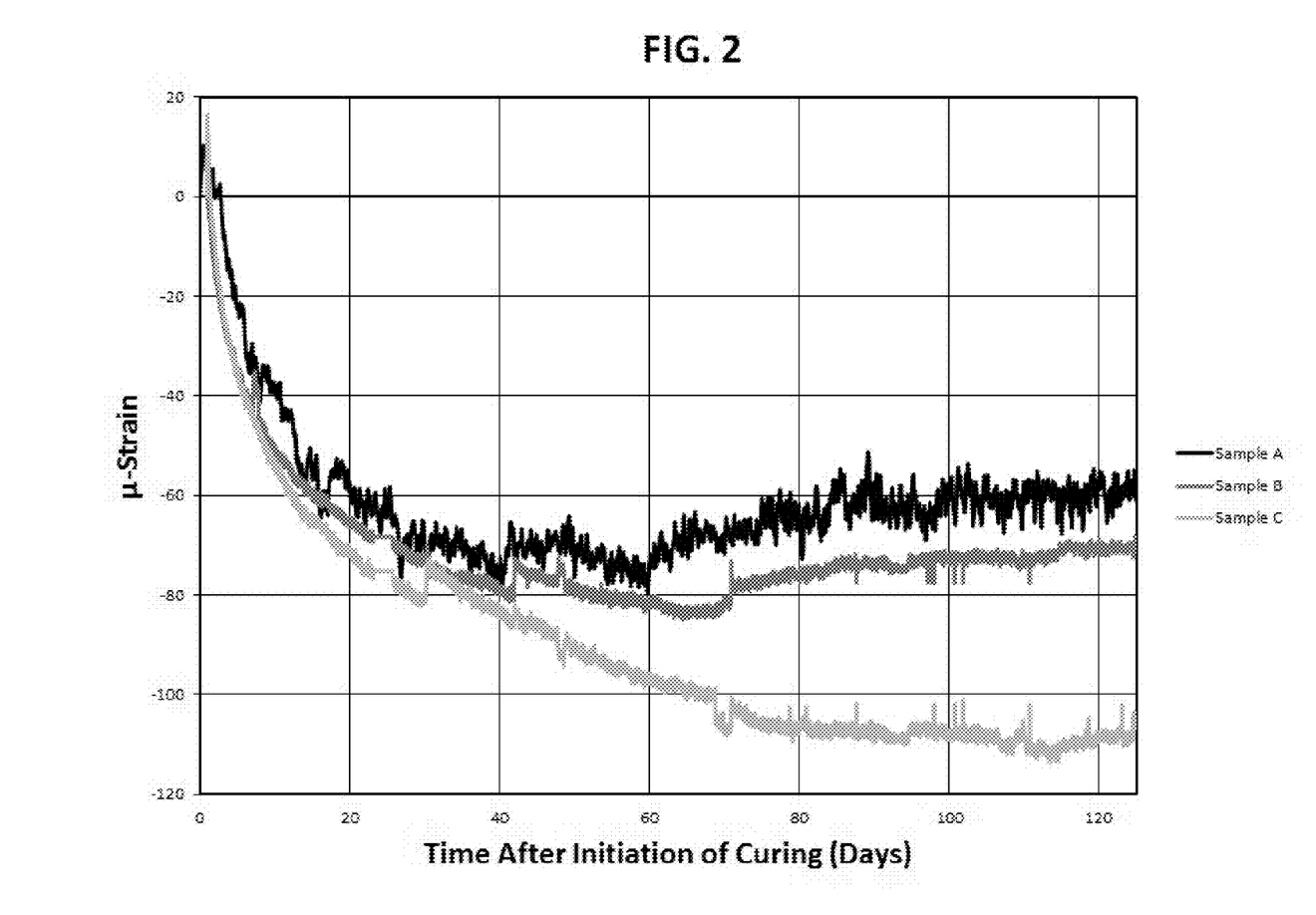
FIG. 2 is a chart depicting compressive strain versus time of illustrative cementitious compositions tested according to ASTM C1581.

Three additional samples, Samples A, B and C, of cementitious compositions according to Example 22 were tested according to ASTM C1581. The results of this testing are shown in FIG. 2. FIG. 2 shows that cementitious compositions including a subject CRA are able to maintain compressive strain for at least 125 days, exhibiting no cracking which resulted in a sudden decrease in compressive strain. Samples A and B also show that cementitious compositions including a subject CRA are able to undergo gradual decreases in compressive strain. This indicates that the cementitious compositions are experiencing cracks on the nano- and/or micro-scales which do not propagate to the extent of drastically reducing the strength of the cementitious composition.

The following examples were prepared with Lehigh Type I/II cement, class F fly ash, silica fume, #8 limestone ("LS"), sand, water, a water-reducing admixture ("WRA") and either no additional admixture or a crack reducing admixture ("CRA") comprising the compound of formula IV, above, in the amounts shown in Table 6. The amounts of cement, fly ash, silica fume, limestone, sand and water are in lbs/yd$^3$, the amount of the WRA is in fluid ounces per hundred weight of cement, and the amount of CRA is in gallons per cubic yard of cementitious composition. Table 6 also provides the slump in inches and the % air content for each example.

TABLE 6

| Example No. | Comp. 23 | 24 | 25 | 26 |
|---|---|---|---|---|
| Cement | 674 | 674 | 674 | 674 |
| Fly Ash | 50 | 50 | 50 | 50 |
| Silica Fume | 76 | 76 | 76 | 76 |
| #8 LS | 1800 | 1800 | 1800 | 1800 |
| Sand | 1185 | 1185 | 1185 | 1185 |
| Water | 280 | 280 | 280 | 280 |
| WRA | 12.0 | 12.0 | 12.0 | 12.0 |
| CRA | — | 1.0 | 1.5 | 2.0 |
| Slump (in.) | 7.75 | 8.5 | 8.75 | 9.0 |
| Air (%) | 2.0 | 2.1 | 2.0 | 2.3 |

Figure 3:
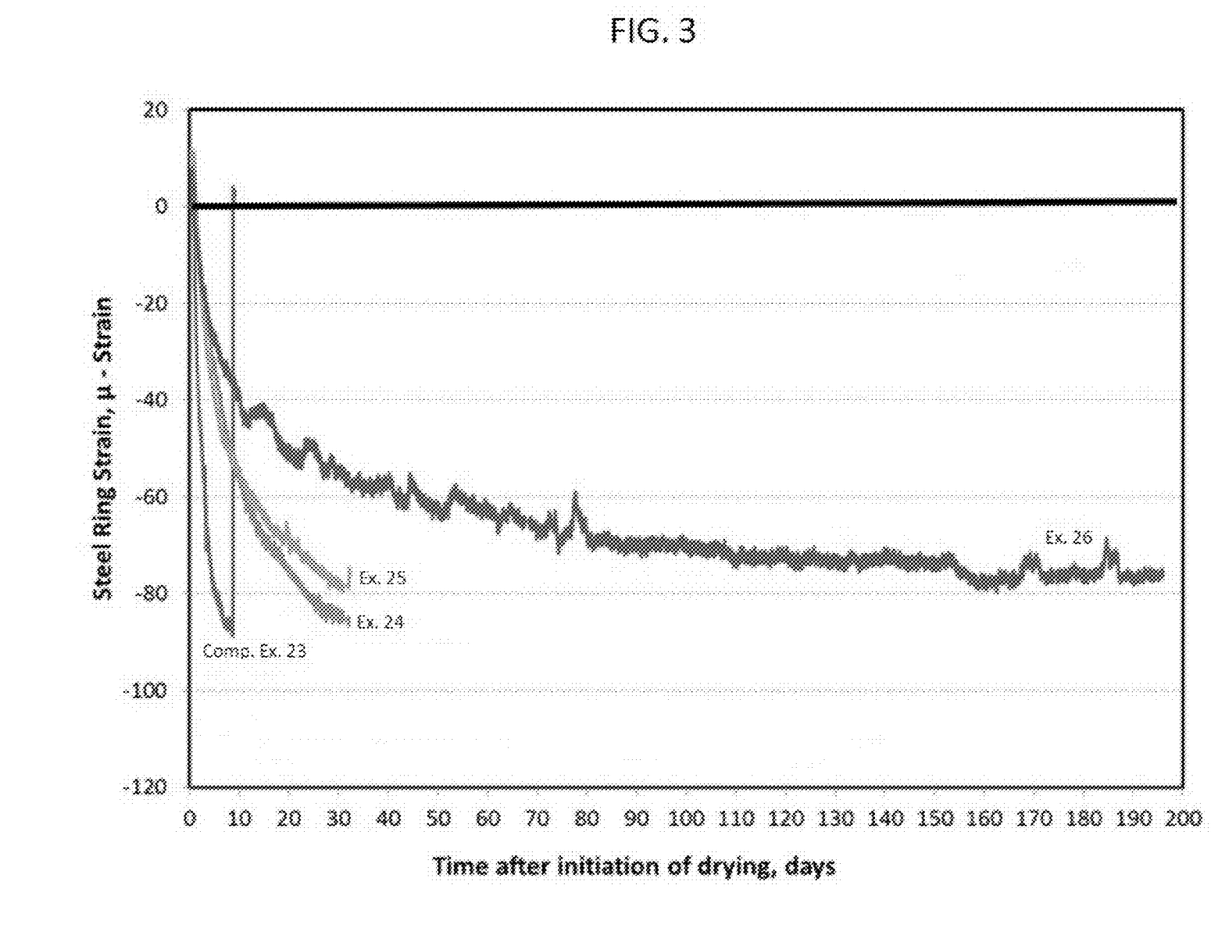
FIG. 3 is a chart depicting compressive strain versus time of illustrative cementitious compositions tested according to ASTM C1581.

Samples of cementitious composition according to Comparative Example 23 and Examples 24 through 26, were tested according to ASTM C1581. The results of this testing are shown in FIG. 3. FIG. 3 shows that cementitious compositions including a subject CRA exhibit longer times to failure (where the respective line on the chart goes to 0µ-strain) than cementitious compositions not including a CRA. Gathering of data for Examples 24 and 25 was terminated prior to cracking at about 30-35 days in order to reallocate testing equipment. Testing of Example 26 was terminated prior to cracking at 196 days. In contrast, Comparative Example 23 cracked at about 9 days.

The following examples were prepared with Lehigh Type I/II cement, class F fly ash, silica fume, sand, water, a water-reducing admixture ("WRA") and either no additional admixture or a crack reducing admixture ("CRA") comprising the compound of formula IV, above, in the amounts shown in Table 7. The amounts of cement, fly ash, silica fume, sand and water are in lbs/yd$^3$, the amount of the WRA is in fluid ounces per hundred weight of cement, and the amount of CRA is in gallons per cubic yard of cementitious composition.

TABLE 7

| Example No. | Comp. 27 | 28 |
|---|---|---|
| Cement | 1105 | 1105 |
| Fly Ash | 82 | 82 |
| Silica Fume | 125 | 125 |
| Sand | 1950 | 1950 |
| Water | 459 | 459 |
| WRA | 10 | 10 |
| CRA | — | 2.0 |

A large-scale restrained slab test was conducted to evaluate the restrained shrinkage cracking potential of an untreated mortar mixture and a CRA-treated mortar mixture. The large-scale restrained slab test included a slab of mortar in a "dog-bone" shape, with a total length of about 84 inches. The slab of mortar is restrained by a restraint device which isolates the strain experienced by the slab to a "drying surface" portion of the slab, which is the narrow portion of the "dog-bone" shape, having a top-surface dimension of about 8 inches by about 48 inches. A linear variable differential transformer ("LVDT") gauge having a length of about 28 inches was fixed to a central portion of the drying surface of the slab specimen in order to detect the formation and width of any cracks which may form in the drying surface portion of the slab.

Six slabs of Comparative Example 27 and three slabs of Example 28 were tested using the large-scale restrained slab test. The average age at cracking of the slabs of Comparative Example 27 was 2.7 days, with an average initial crack width of 209 μm. The average age at cracking of the slabs of Example 28 was 8.0 days, with an average initial crack width of 122 μm.

The following examples were prepared with Lehigh Type I/II cement, class F fly ash, silica fume, #8 limestone ("LS"), sand, water, a water-reducing admixture ("WRA") and either no additional admixture or a crack reducing admixture ("CRA") comprising at least one compound of formula III, above, in the amounts shown in Table 8. Example 30 included a CRA comprising a compound of formula III wherein v was 2 and w was 2. Example 31 included a CRA comprising a compound of formula III wherein v was 5 and w was 0. Example 32 included a CRA comprising a compound of formula III wherein v was 2 and w was 0 and a compound of formula III wherein v was 3 and w was 0, such that the average value of v was about 2.5 for the CRA of Example 32. Example 33 included a CRA comprising a compound of formula III wherein v was 4 and w was 0. The amounts of cement, fly ash, silica fume, limestone, sand and water are in lbs/yd³, the amount of the WRA is in fluid ounces per hundred weight of cement, and the amount of CRA is in gallons per cubic yard of cementitious composition.

TABLE 8

| Example No. | Comp. 29 | 30 | 31 | 32 | 33 |
|---|---|---|---|---|---|
| Cement | 674 | 674 | 674 | 674 | 674 |
| Fly Ash | 50 | 50 | 50 | 50 | 50 |
| Silica Fume | 76 | 76 | 76 | 76 | 76 |
| #8 LS | 1800 | 1800 | 1800 | 1800 | 1800 |
| Sand | 1185 | 1185 | 1185 | 1185 | 1185 |
| Water | 280 | 280 | 280 | 280 | 280 |
| WRA | 12.0 | 12.0 | 12.0 | 12.0 | 12.0 |
| CRA | — | 2.0 | 2.0 | 2.0 | 2.0 |

Figure 4:
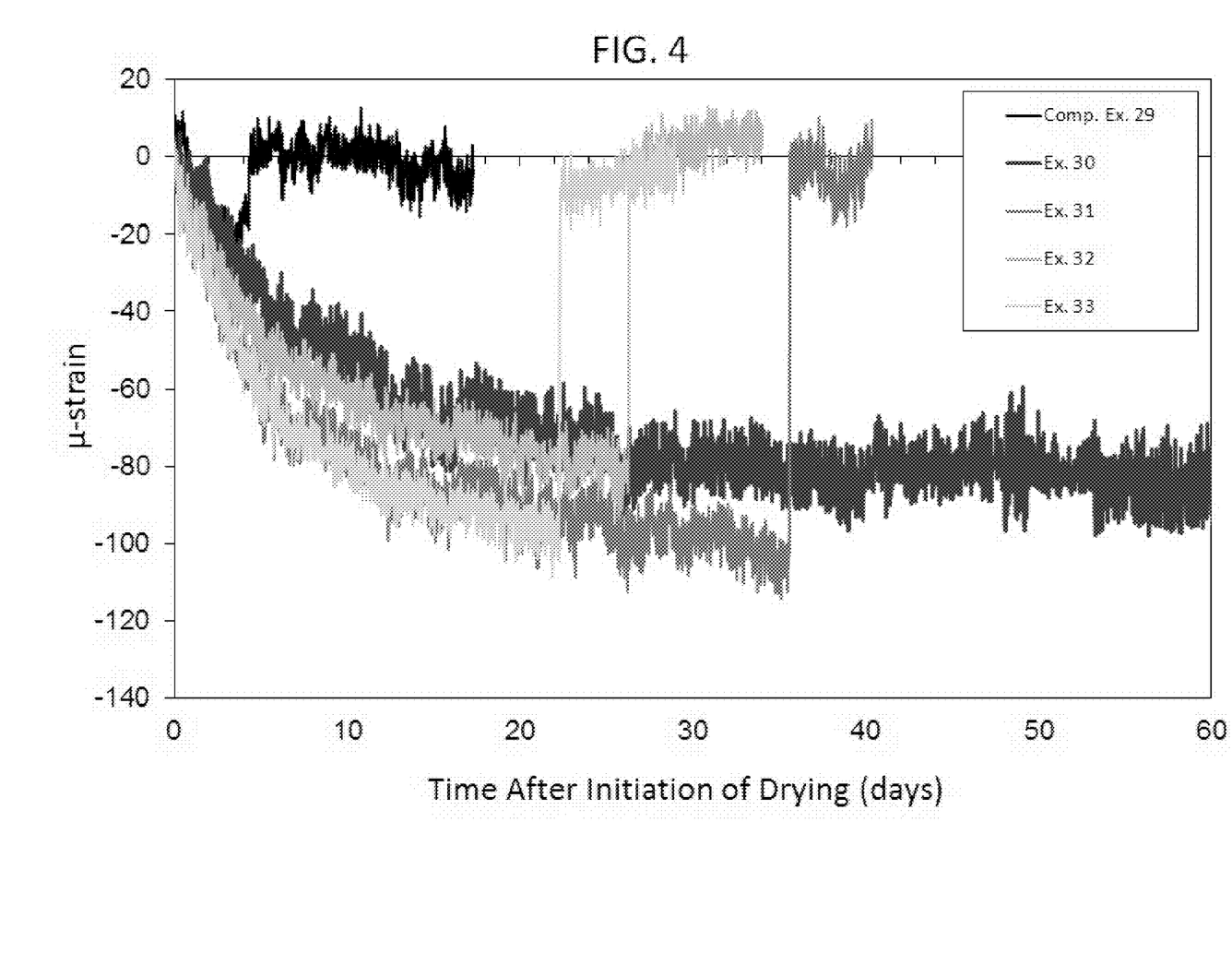
FIG. 4 is a chart depicting compressive strain versus time of illustrative cementitious compositions tested according to ASTM C1581.

Samples of cementitious composition according to Comparative Example 29 and Examples 30 through 33, were tested according to ASTM C1581. The results of this testing are shown in FIG. 4. FIG. 4 shows that cementitious compositions including a subject CRA including at least one compound according to formula (III) exhibit longer times to failure (where the respective line on the chart goes to 0μ-strain) than cementitious compositions not including a CRA.

In a first embodiment, provided is a cementitious composition comprising at least one cementitious material and at least one crack reducing admixture comprising: (i) from 0 to about 5 weight percent of at least one alcohol, based on the total weight of the admixture excluding water; and (ii) a compound having the chemical structure of formula (III):

wherein: v is an integer from 0 to 50; optionally from 1 to 25; further optionally from 2 to 10; and w is an integer from 0 to 50; optionally from 1 to 25; further optionally from 2 to 10; with the proviso that the sum of v and w is at least 1 but not greater than 50; and wherein, during curing, the cementitious composition exhibits no cracks wider than about 175 μm.

The cementitious composition of the first embodiment may further include that the crack reducing admixture is present in the cementitious composition in an amount of about 0.25 to about 4 gallons per cubic yard of the cementitious composition.

The cementitious composition of either or both of the first or subsequent embodiments may further include that v is 2 and w is 2.

The cementitious composition of any of the first or subsequent embodiments may further comprise at least one air entraining admixture. The air entraining admixture may comprise at least one synthetic air entrainer and/or at least on natural air entrainer. The air entraining admixture may comprise at least one of fatty acid air entrainers, alkylbenzene sulfonate-based air entrainers, α-olefin sulfonate-based air entrainers, ethoxylated alcohol based air entrainers, tall oil, vinsol resin, or rosin.

The cementitious composition of any of the first or subsequent embodiments may further comprise aggregate and water.

The cementitious composition of any of the first or subsequent embodiments may further include that the crack reducing admixture is present in the cementitious composition in an amount of about 0.5 to about 3 gallons, optionally about 1 to about 2 gallons, per cubic yard of the cementitious composition The cementitious composition of any of the first or subsequent embodiments may further include that, during curing, the cementitious composition exhibits no cracks wider than about 100 μm.

The cementitious composition of any of the first or subsequent embodiments may further include that the crack reducing admixture further comprises at least one acid in an amount effective to at least partially neutralize the admixture to reduce or eliminate the formation of precipitates in the admixture, optionally wherein the at least one acid comprises acetic acid.

In a second embodiment, provided is a method of making a cementitious composition comprising mixing a cementitious material and the crack reducing admixture of the cementitious composition of any one of the first or subsequent embodiments.

In a third embodiment, provided is a method of reducing or eliminating the formation of cracks in a cementitious composition as the cementitious composition cures, comprising adding to the uncured cementitious composition at least one crack reducing admixture comprising a compound having the chemical structure of formula (III):

wherein: v is an integer from 0 to 50; optionally from 1 to 25; further optionally from 2 to 10; and w is an integer from 0 to 50; optionally from 1 to 25; further optionally from 2 to 10; with the proviso that the sum of v and w is at least 1 but not greater than 50.

In a fourth embodiment, provided is a method of limiting the size of cracks which form in a cementitious composition as the cementitious composition cures to a width of less than or equal to about 175 μm, optionally to a width less than or equal to about 100 μm, comprising adding to the uncured cementitious composition at least one crack reducing admixture comprising a compound having the chemical structure of formula (III):

wherein: v is an integer from 0 to 50; optionally from 1 to 25; further optionally from 2 to 10; and w is an integer from 0 to 50; optionally from 1 to 25; further optionally from 2 to 10; with the proviso that the sum of v and w is at least 1 but not greater than 50.

The methods of either or both of the third or fourth embodiments may further include that v is 2 and w is 2.

The methods of any of the third, fourth or subsequent embodiments may further comprise adding at least one air entraining admixture to the cementitious composition. The air entraining admixture may comprise at least one synthetic air entrainer and/or at least one natural air entrainer. The air entraining admixture may comprise at least one of fatty acid air entrainers, alkylbenzene sulfonate-based air entrainers, α-olefin sulfonate-based air entrainers, ethoxylated alcohol based air entrainers, tall oil, vinsol resin, or rosin.

The methods of any of the third, fourth or subsequent embodiments may further comprise adding aggregate and water to the cementitious composition.

The methods of any of the third, fourth or subsequent embodiments may further include that the crack reducing admixture is added to the cementitious composition in an amount of about 0.25 to about 4 gallons, optionally about 0.5 to about 3 gallons, further optionally about 1 to about 2 gallons, per cubic yard of the cementitious composition.

The methods of any of the third, fourth or subsequent embodiments may further include that the crack reducing admixture further comprises at least one acid in an amount effective to at least partially neutralize the admixture to reduce or eliminate the formation of precipitates in the admixture, optionally wherein the at least one acid comprises acetic acid.

It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

What is claimed is:

1. A cementitious composition comprising at least one cementitious material and at least one crack reducing admixture comprising: (i) from 0 to about 5 weight percent of at least one alcohol, based on the total weight of the admixture excluding water; and (ii) a compound having the chemical structure of formula (III):

wherein:
v is an integer from 0 to 50; and
w is an integer from 0 to 50;
with the proviso that the sum of v and w is at least 1 but not greater than 50; and
wherein, during curing, the cementitious composition exhibits no cracks wider than about 175 μm.

2. The cementitious composition of claim 1, wherein v is 2 and w is 2.

3. The cementitious composition of claim 1, further comprising at least one air entraining admixture.

4. The cementitious composition of claim 3, wherein the air entraining admixture comprises at least one synthetic air entrainer and/or at least one natural air entrainer.

5. The cementitious composition of claim 4, wherein the air entraining admixture comprises at least one of fatty acid air entrainers, alkylbenzene sulfonate-based air entrainers, α-olefin sulfonate-based air entrainers, ethoxylated alcohol based air entrainers, tall oil, vinsol resin, or rosin.

6. The cementitious composition of claim 1, further comprising aggregate and water.

7. The cementitious composition of claim 1, wherein the crack reducing admixture is present in the cementitious composition in an amount of about 0.25 to about 4 gallons per cubic yard of the cementitious composition.

8. The cementitious composition of claim 1, wherein, during curing, the cementitious composition exhibits no cracks wider than about 100 μm.

9. The cementitious composition of claim 1, wherein the crack reducing admixture further comprises at least one acid in an amount effective to at least partially neutralize the admixture to reduce or eliminate the formation of precipitates in the admixture, optionally wherein the at least one acid comprises acetic acid.

10. A method of reducing or eliminating the formation of cracks in a cementitious composition as the cementitious composition cures, comprising adding to the uncured cementitious composition at least one crack reducing admixture comprising: (i) from 0 to about 5 weight percent of at least one alcohol, based on the total weight of the admixture excluding water; and (ii) a compound having the chemical structure of formula (III):

(III)

wherein:
v is an integer from 0 to 50; and
w is an integer from 0 to 50;
with the proviso that the sum of v and w is at least 1 but not greater than 50; and
wherein, during curing, the cementitious composition exhibits no cracks wider than about 175 μm.

11. The method of claim 10, wherein v is 2 and w is 2.

12. The method claim 10, further comprising adding at least one air entraining admixture to the cementitious composition.

13. The method of claim 12, wherein the air entraining admixture comprises at least one synthetic air entrainer and/or at least one natural air entrainer.

14. The method of claim 13, wherein the air entraining admixture comprises at least one of fatty acid air entrainers, alkylbenzene sulfonate-based air entrainers, α-olefin sulfonate-based air entrainers, ethoxylated alcohol based air entrainers, tall oil, vinsol resin, or rosin.

15. The method of claim 10, further comprising adding aggregate and water to the cementitious composition.

16. The method of claim 10, wherein the crack reducing admixture is added to the cementitious composition in an amount of about 0.25 to about 4 gallons per cubic yard of the cementitious composition.

17. The method of claim 10, wherein the crack reducing admixture further comprises at least one acid in an amount effective to at least partially neutralize the admixture to reduce or eliminate the formation of precipitates in the admixture, optionally wherein the at least one acid comprises acetic acid.

18. A method of limiting the size of cracks which form in a cementitious composition as the cementitious composition cures to a width of less than or equal to about 175 μm, comprising adding to the uncured cementitious composition at least one crack reducing admixture comprising: (i) from 0 to about 5 weight percent of at least one alcohol, based on the total weight of the admixture excluding water; and (ii) a compound having the chemical structure of formula (III):

(III)

wherein:
v is an integer from 0 to 50; and
w is an integer from 0 to 50;
with the proviso that the sum of v and w is at least 1 but not greater than 50.

19. The method of claim 18, wherein v is 2 and w is 2.

20. The method of claim 18, wherein the crack reducing admixture is added to the cementitious composition in an amount of about 0.25 to about 4 gallons per cubic yard of the cementitious composition.

21. The cementitious composition of claim 1, wherein v is an integer from 1 to 25 and w is an integer from 1 to 25.

22. The cementitious composition of claim 1, wherein v is an integer from 2 to 10 and w is an integer from 2 to 10.

* * * * *

UNITED STATES PATENT AND TRADEMARK OFFICE
CERTIFICATE OF CORRECTION

PATENT NO. : 9,718,732 B2  
APPLICATION NO. : 14/549942  
DATED : August 1, 2017  
INVENTOR(S) : Schaef et al.

Page 1 of 1

It is certified that error appears in the above-identified patent and that said Letters Patent is hereby corrected as shown below:

On the Title Page

Item (60) entitled "Related U.S. Application Data" should appear and read "Provisional application No. 61/907,779, filed on November 22, 2013".

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*